United States Patent [19]

Tappe et al.

[11] Patent Number: 4,593,806
[45] Date of Patent: Jun. 10, 1986

[54] MULTIPLE TRANSPOSITOR CONVEYOR SYSTEM

[75] Inventors: Gale R. Tappe, New Richmond; Wayne D. Sommer, Amery, both of Wis.

[73] Assignee: Doboy Packaging Machinery, Inc., New Richmond, Wis.

[21] Appl. No.: 539,931

[22] Filed: Oct. 7, 1983

[51] Int. Cl.$^4$ ............ B65G 47/08; B65G 47/30; B65G 47/71; B65G 15/24
[52] U.S. Cl. .................... 198/369; 198/437
[58] Field of Search .............. 198/369, 436, 437

[56] References Cited

U.S. PATENT DOCUMENTS

| | | | |
|---|---|---|---|
| 1,322,813 | 11/1919 | Parker | 198/347 |
| 1,602,753 | 10/1926 | Davis | 198/347 |
| 2,700,448 | 1/1955 | Ames | 198/347 |
| 2,969,883 | 1/1961 | Cargill et al. | 198/355 |
| 3,118,549 | 1/1964 | Hoellen | 414/134 |
| 3,122,229 | 2/1964 | Engleson et al. | 414/96 |
| 3,342,350 | 9/1967 | Seragnoli | 198/347 |
| 3,592,323 | 7/1971 | Ross | 198/347 |
| 4,166,525 | 9/1979 | Bruno | 198/437 |
| 4,281,757 | 8/1981 | Morton | 198/369 |
| 4,282,964 | 8/1981 | Hogenkamp et al. | 198/369 |
| 4,499,988 | 2/1985 | Gasser | 198/369 |

FOREIGN PATENT DOCUMENTS 286197  2/1965  Netherlands ............ 198/437

Primary Examiner—Joseph E. Valenza
Assistant Examiner—Daniel R. Alexander
Attorney, Agent, or Firm—Orrin M. Haugen; Thomas J. Nikolai

[57] ABSTRACT

A conveyor system having a segmented lengthwise supply conveyor comprised of a plurality of dual transpositors, whereby product from the supply conveyor is redirected laterally to a plurality of cross-feed conveyors that, in turn, supply product to stacking and wrapping stations. Overlying each cross-feed conveyor is a primary transpositor drive end having a retractable nose roller and below which a secondary transpositor conveyor having a retractable nose roller is mounted for temporarily storing product before retracting and dropping the product onto the cross-feed conveyor, thereby facilitating a continuous through put of product to each of said wrapping stations. Photo electric transmitter/receiver and a programmable controller ensure system synchronization.

7 Claims, 7 Drawing Figures

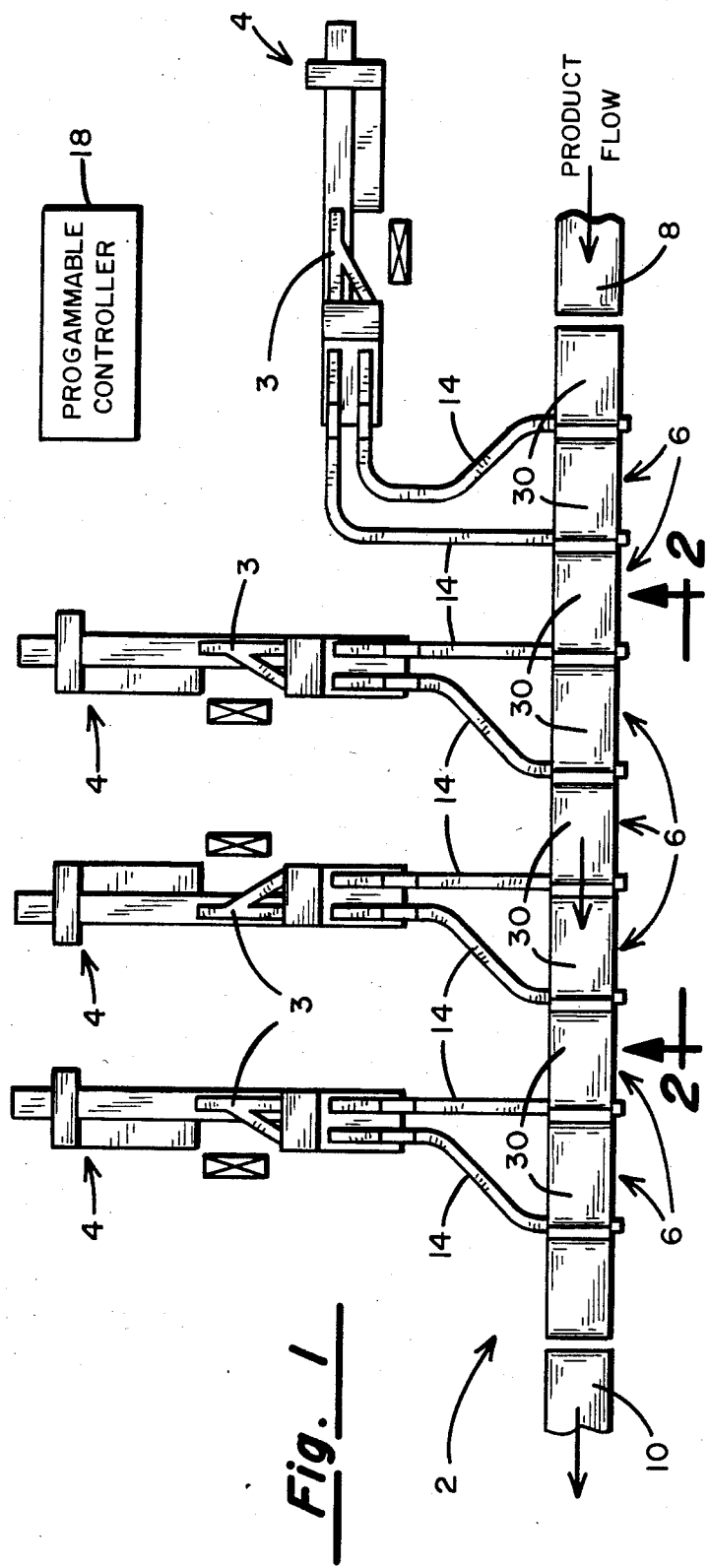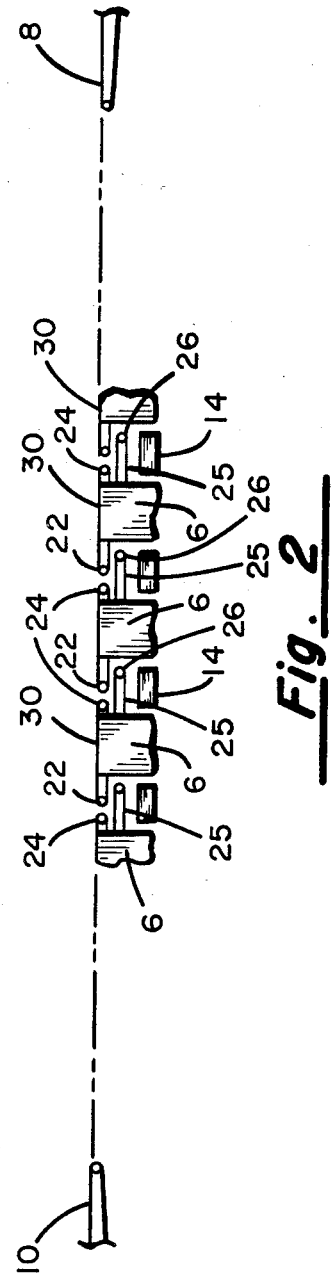

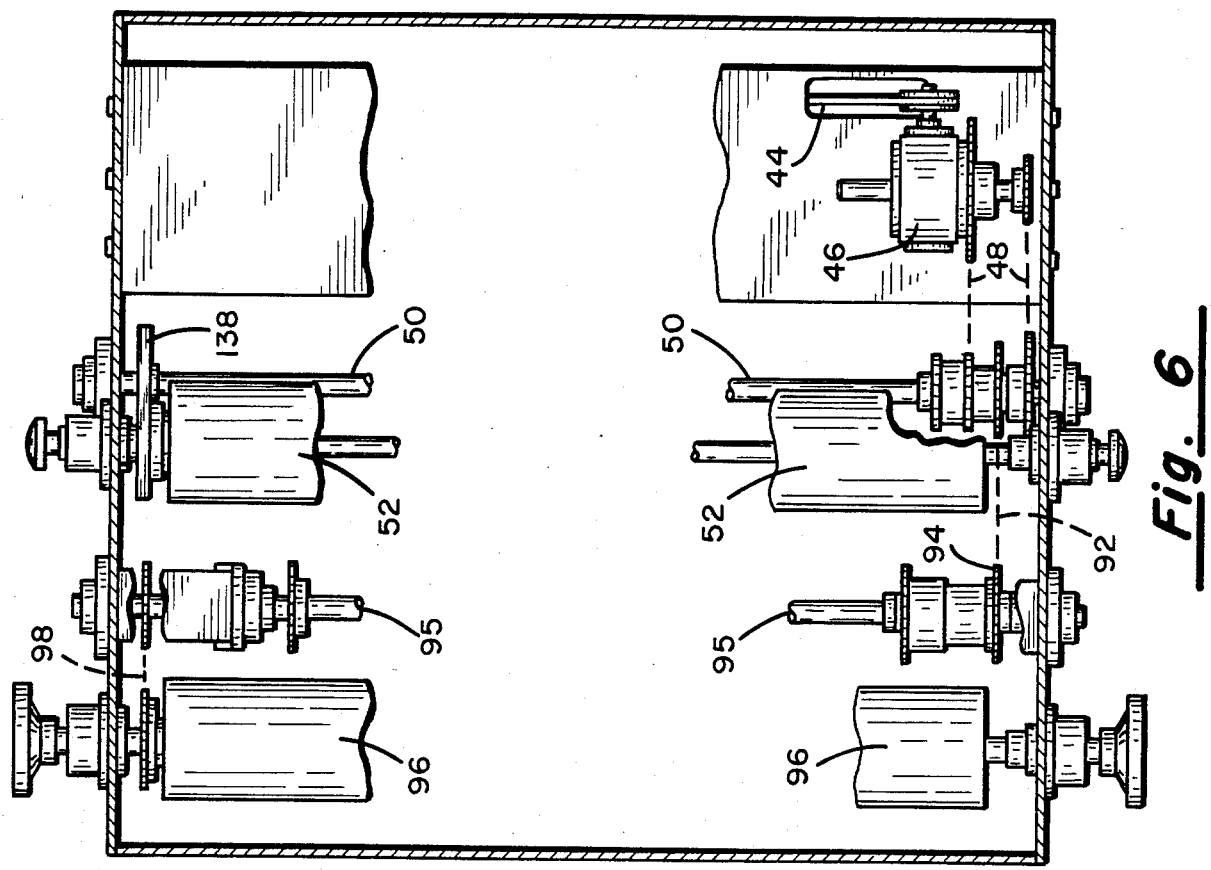
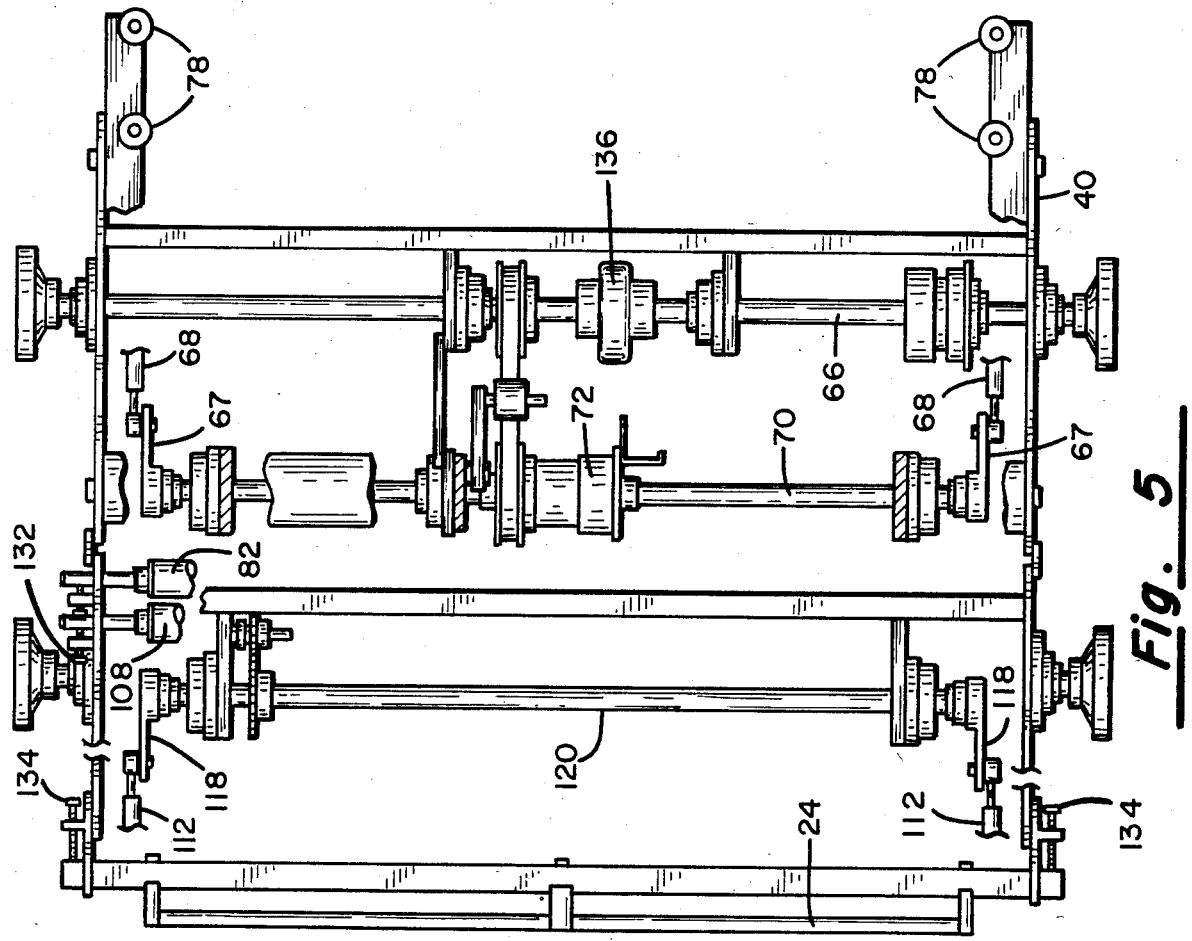

MULTIPLE TRANSPOSITOR CONVEYOR SYSTEM

BACKGROUND OF THE INVENTION

The present invention relates to conveyor systems and, in particular, to a system wherein a supply conveyor feeds a plurality of work stations laterally mounted relative to the supply conveyor via associated cross-feed conveyors and intermediate transpositors. The transpositors each include a pair of conveyors mounted one above the other and both being disposed above the cross feed conveyor. The conveyors of the transpositor each have a retractable conveyor end for controllably supplying product from the supply portion (primary) transpositor conveyor to a storage (secondary) transpositor conveyor and finally to the cross-feed conveyor.

Conveyor systems have long been employed in industry for controllably conveying products through a series of successive packaging steps. Support assemblies for containing the products are typically used with the conveyor system so as to appropriately constrain the movement of the product as it is directed to various workstations. To optimize floor space relative to such conveyors, and in particular flat conveyors, it is oftentimes necessary to direct the product from a primary conveyor to associated secondary and tertiary conveyors, which, in turn, redirect the product flow in directions different from that of the primary conveyor.

This transfer function has been achieved in a variety of fashions and, occasionally, via the use of intermediate storage conveyors, such as in U.S. Pat. No. 2,700,448. Such storage conveyors typically receive and temporarily hold the product prior to transferring it to yet another conveyor, operating in a different direction from the supply conveyor. This transfer process must take place without damaging the product being transported. It is with respect to this delayed directional transfer that the present invention is particularly directed. Specifically, the present invention is directed to a system and apparatus for receiving and conveying, for example, food products and directing them to associated wrapping stations. Directional transfers are achieved by using a supply conveyor having a plurality of transpositors coupled thereto in an end-to-end fashion. As mentioned, the transpositors each contain a pair of conveyors having retractable conveyor ends, whereby selected rows of transported product are dropped from a primary transpositor conveyor onto an underlying secondary transpositor conveyor. Subsequently, upon retraction of the secondary transpositor conveyor, the product is deposited onto a cross-feed conveyor, all this taking place without interrupting the flow of the product on the primary transpositor conveyor. Photo electric transmitter/receivers are used to monitor the flow of product relative to the primary and secondary transpositor conveyors. A programmable controller coupled to the transpositor also monitors the speed of the system supply conveyor, each of the cross-feed conveyors and the wrapping stations to thereby automatically control system throughput.

The above objects, advantages and distinctions of the present apparatus will, however, become more apparent upon reference to the following description thereof with respect to the following drawings. In this regard, it is to be recognized that the following description is made with respect to the presently preferred embodiment only and that various modifications may be made either to the transpositors or to the system configuration without departing from the spirit and scope of the present invention.

BRIEF DESCRIPTION OF THE DRAWINGS

FIG. 1 shows a generalized system diagram of a supply conveyor including a plurality of transpositors and plurality laterally positioned stacking and wrapping stations.

FIG. 2 is a partial side elevation taken along lines 2—2 of FIG. 1 showing the end-to-end overlapping disposition of the transpositor conveyors relative to one another and to the underlying cross-feed conveyor.

FIG. 5 is a cross-section view taken along lines 5—5 of FIG. 3.

FIG. 6 is a cross-section view taken along lines 6—6 of FIG. 3.

SUMMARY OF THE INVENTION

Figure 4:
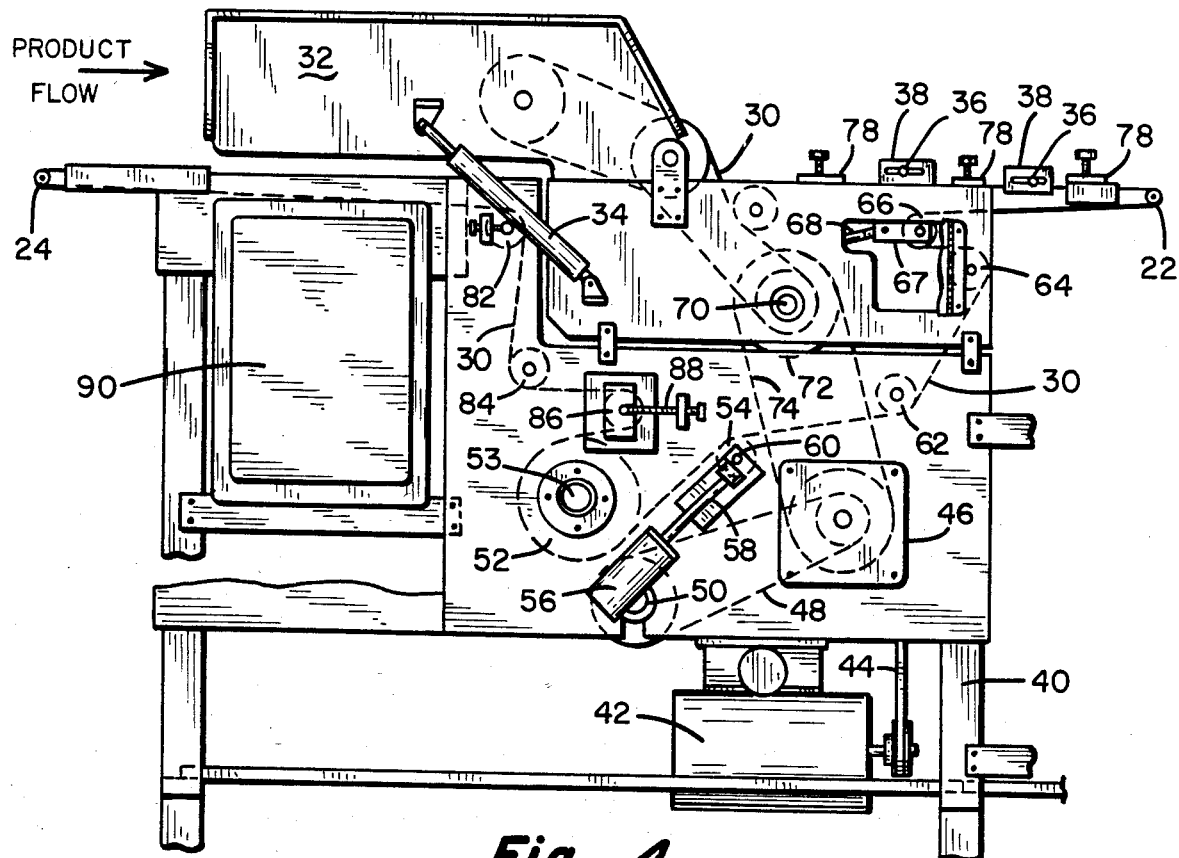
FIG. 4 is a side elevation view of a single transpositor containing only a primary transpositor conveyor belt.

The present invention is directed to a conveyor system which includes a system supply conveyor comprised of a plurality of dual transpositors positioned in tandem, each conveyor of which overlays a transversely directed associated cross-feed conveyor, and which controllably redirects product flow from the supply conveyor to intermediate storage transpositor conveyors and thence to selected cross-feed conveyors. Each dual transpositor employed in the system may be comprised of an overlying primary transpositor conveyor having a fixed and a retractable conveyor end, a segment about which an endless primary conveyor belt revolves for transferring product to the primary transpositor conveyor belt of the adjacent dual transpositor utilized in the system.

Each cross-feed conveyor is supplied from its associated dual transpositor via the retractable conveyor end of the primary transpositor conveyor. When an unfilled condition on an underlying secondary or storage transpositor conveyor is detected, the end segment of the primary conveyor retracts and drops products onto the lower, secondary transpositor conveyor which then supports the product until the cross-feed conveyor is clear and able to accept more product. The secondary transpositor conveyor is indexable and also has a retractable conveyor end segment as it can also appropriately drop product onto the cross-feed conveyor, while the overlying primary transpositor conveyor continues to transfer product to the adjacent down-stream dual transpositor of the system supply conveyor.

Mounted within each dual transpositor is a plurality of idler, tensioning and drive rollers, about which the primary and secondary transpositor conveyor belts revolve. Pneumatically controlled plungers maintain belt alignment. Photo electric transmitter/receivers oriented so as to cross-scan the conveyor belts at the retractable ends control product flow in conjunction with a programmable controller.

DESCRIPTION OF THE PREFERRED EMBODIMENT

Referring to the generalized diagram of FIG. 1, there is shown a conveyor system including a system supply conveyor 2 arranged to supply a plurality of stacking stations 3 and wrapping stations 4 with stacked products being processed. The unwrapped product is conveyed to the wrapping stations 4 via a plurality of dual transpositors 6 which are coupled in an end-to-end fashion intermediate an in-feed conveyor 8 and a system storage conveyor 10 (which may be recoupled to the in-feed conveyor 8).

Each of the dual transpositors 6 is comprised of an upper, primary transpositor conveyor 30 and a lower secondary transpositor conveyor which is shown in FIG. 1, but which will be described in detail hereinafter. Each of the dual transpositors 6 is also mounted such that a pair of retractable ends for each extend over an underlying transversely oriented cross-feed conveyor 14. Two such crossfeed conveyors 14 are arranged to deliver product to each stacking station 3 and associated wrapping station 4. Thus, as the products (which in the presently preferred embodiment are typically deposited ten abreast) are transferred along the system supply conveyor 2 past the dual transpositors 6, rows of product are selectively dropped at each dual transpositor by retracting a retractable conveyor end on the primary transpositor conveyor 30. This allows the product to fall onto the underlying secondary transpositor conveyor (not shown in FIG. 1). The secondary transpositor conveyor, in turn, is capable of retracting its retractable conveyor end in response to control signals developed from appropriately mounted photo electric transmitter/receivers (not shown) acting in conjunction with a programmable controller 18 so as to drop the product onto the selected cross-feed conveyor 14.

The product may then be conveyed via each of the cross-feed conveyors 14 to an associated stacking station 3, where the products on each of the associated pair of cross-feed conveyors 14 are grouped, for example, put into groupings of three units and these groups may then be placed one on top of the other before entering the wrapping station 4. Thus, at the wrapping station, a six-pack of product may be covered by an appropriate film. It is to be recognized, however, that while the preferred embodiment is being explained in supplying product to a number of stacking stations 3 and wrapping stations 4, a myraid of other conveyor system permutations are achievable using the present dual transpositor 6, depending upon an individual's requirements. The hallmark of any such system, however, is the provision of an uninterrupted, controllable product flow that is achieved by means of one or more dual transpositors.

Referring next to FIG. 2, a partial side elevation view taken along lines 2—2 of FIG. 1 is shown. FIG. 2 shows in outline a plurality of the dual transpositors 6 and their associated nose rollers 22 and 24. In particular, and looking along the overlying supply conveyor path 2, it is to be noted that the downstream nose roller 22 for the primary transpositor conveyor 30 of each dual transpositor 6 is retractable, while the nose rollers 24 at the upstream end of each of the dual transpositors 6 is not. Underlying the nose rollers 22 and 24 is a further conveyor 25 having a retractable nose roller 26 associated with each dual transpositor. The transpositors' secondary conveyors 25 thus receive product from an associated transpositor primary conveyor 30, upon the retraction of the nose rollers 22, and can redeposit the product onto the cross-feed conveyors 14 upon the retraction of the nose rollers 26.

Figure 3:
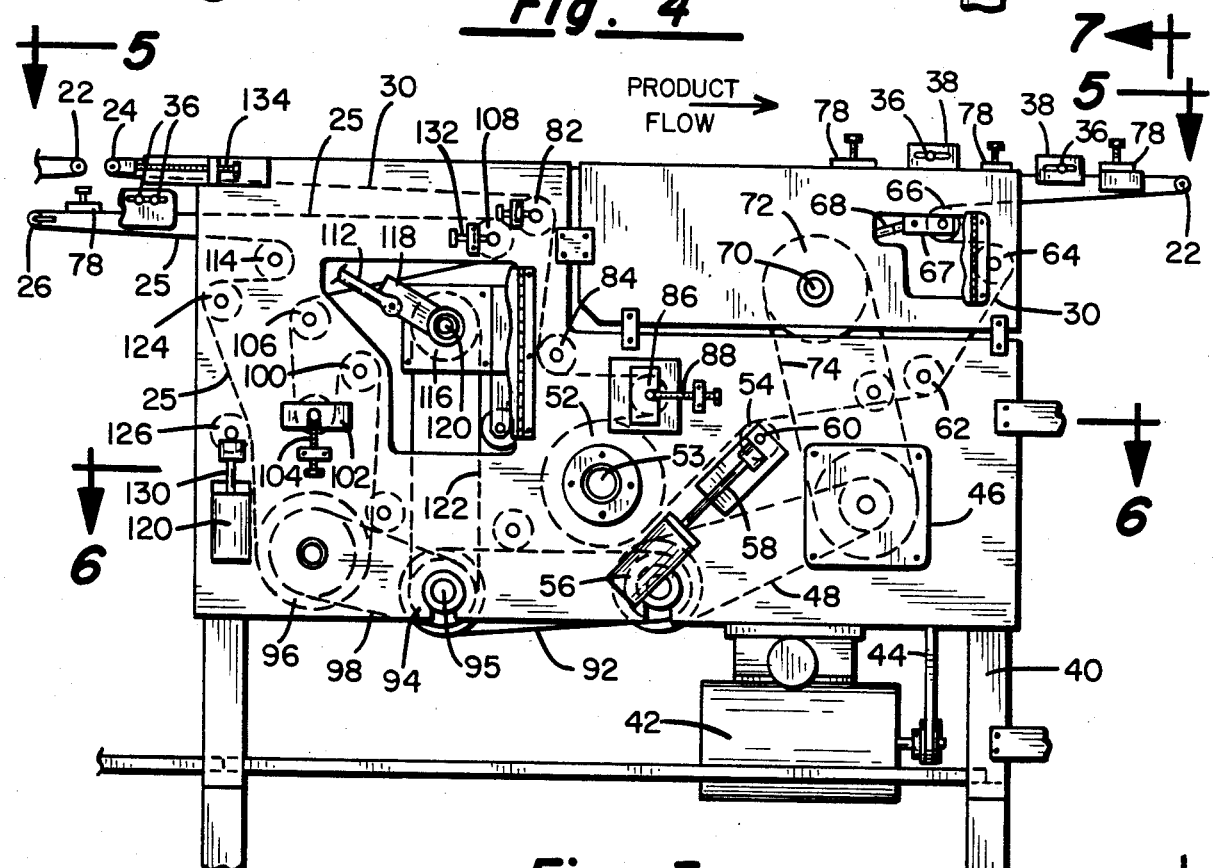
FIG. 3 is a side elevation view of a dual transpositor used in the system of the present invention.

Referring now to FIG. 3, there is illustrated an elevation view of a typical dual transpositor 6. It includes a primary conveyor belt 30 that is wrapped about the retractable discharge conveyor end or nose 22 and a stationary infeed end 24. Referring first to the drive assembly associated with the primary transpositor conveyor 30, it is to be noted that food products, such as pizzas or other similar items, may enter the transpositor 6 via the conveyor belt or chain 30 passing about the stationary nose roller 24 and are conveyed to the right (the left in FIGS. 1 and 2) until reaching the retractable nose roller 22. A pair of photo electric transmitter/receivers 36 are mounted on opposite sides of the transpositor 6 proximate the retractable discharge end 22 and are used to detect the presence or absence of products in relation thereto. Of the photo transmitter/receivers 36, a transmitter is typically mounted on one side of the transpositor 6 while a receiver is mounted on the other side, diagonally opposite thereto. Also, each of the photo electric transmitter/receivers 36 are typically transversely adjustable relative to the other by means of a plate 38 which contains an elongated slot therein for positionably mounting the transmitter/receivers 36 therealong. Thus, as the products pass the photo electric transmitter/receivers 36, the transmitter/receivers 36 may be adjusted so as to not only detect the presence of the product, but also the relative alignment of the product to one another in each row. Depending upon the condition of the other control signals applied to the programmable controller 18 by the photo electric transmitter/receivers 36 associated with the mating dual transpositor 6 and its retractable nose roller 26 and those associated with the underlying cross-feed conveyor 14, the retractable nose rollers 22 and 26 will be retracted or not.

Mounted at the bottom of the frame 40 is a motor 42. It is coupled via a belt 44 to a 90° transfer gear assembly 46 that is, in turn, coupled via a chain 48 to a first end of a sprocked axle 50. The other end of the axle has another sprocket keyed to it and that second sprocket is directly coupled to the drive roller 52 mounted on axle 53. The drive roller 52 extends across the width of the transpositor 6 and is slightly crowned at its center so as to facilitate the centering alignment of the conveyor belt 30 therearound. The forwardly mounted alignment roller 54, in turn, supports the belt 30 in a floating relationship relative to a pair of pneumatic actuators having cylinders 56 and plunges 58 reciprocally disposed therein. The piston/cylinders are mounted on opposite sides of the frame 40 and controllably raise or lower the ends of the axle 60 and thereby adjust the right-left alignment of the belt 30.

The primary belt 30 is successively wrapped around idler rollers 62, 64, and 66 and the retractable nose roller 22 at the discharge end of the transpositors. The roller 66 is coupled at its opposite ends to a pair of fixed arms 67 and a pair of length adjustable linking arms 68 that are coupled to the axle 70. Axle 70 is clutch driven via an elctronically actuable center mounting clutch 72. The clutch 72 is driven via a toothed belt 74 that is coupled to a mating sprocket on the 90° drive unit 46. A tensioner (not shown) adjusts the tension of the belt. Thus, upon actuating the clutch 72, it causes axle 70 to turn one complete revolution. The linking arms 67 and 68 then retracts the spring loaded roller 66 which retracts the nose roller 22 mounted to the discharge end. The nose roller 22 is spring mounted and retracts along the horizontally mounted V-rollers 78. The nose roller 22 returns to its rest position as the linking arms 67 and 68 return to their rest position. As previously mentioned, such a retraction typically occurs each time the programmable controller 18 determines that the conveyor 25 is clear of product and thus ready to receive the additional product.

Upon continuing past the retractable nose roller 22, the primary transpositor conveyor belt 30 passes over the fixed nose roller 24 to an adjustable tensioning roller 82 and idler roller 84 and from there passes around yet another spring loaded tensioning roller 86. The tension is adjusted via a pair of springs 88 mounted on opposite sides of the frame 40. The belt then returns to the drive roller 52 completing its orbit. In passing, it should also be noted that the axle associated with the roller 66 is split and center coupled so as to facilitate the replacement of the belt 30, should it tear or otherwise become abraided.

Turning attention now to the secondary transpositor conveyor belt 25, drive power to the secondary drive assembly is obtained via a chain 92 that couples the driven sprocket and axle 50 to the transfer sprocket 94 and from there to a crowned drive roller 96 via chain 98. The secondary conveyor belt 25, in turn, is mounted about the crowned drive roller 96 and passes in a clockwise fashion about the idler roller 100 and the tensioning roller 102. Tensioning roller has a pair of tension maintaining springs 104 mounted to the axles thereof. The belt 25 next passes over idler rollers 106 and the adjustable tensioning roller 108 to the retractable nose roller 26.

The retractable nose roller 26 operates much like the retractable nose roller 22 in that a pair of oppositely mounted, length adjustable linking arms 112 are coupled at opposite sides to the retractable roller 114. An axle mounted clutch 116, in turn, indirectly couples a pair of arms 118 mounted at opposite ends of axle 120 to the linking arms 112. Upon applying power thereto via transfer sprocket assembly 94 and chain 122, axle 120 rotates 360° causing the nose roller 26 to retract. At the same time the storage belt 25 is advanced so that as the product is dropped from the overlying primary transpositor conveyor 30, it strikes a different area of the secondary belt 25. Again, "V" rollers 78 control the movement of the nose roller 26 while a pair of adjustable photo electric transmitter/receivers 36 advise the programmable controller 18 of the presence or absense and alignment of the product. The retraction of nose roller 22 occurs very fast and the height separation between nose roller 22 and nose roller 26 is not sufficient to induce significant misalignment in the row of product as the nose rollers 22 and 26 are retracted and the products are successively dropped.

After passing over the retractable roller 114, the belt 25 passes over idler roller 124 and alignment roller 126. The secondary belt 25, like the primary belt 30, is also aligned by means of a second pair of pneumatic cylinders 128 and pistons 130 that are coupled to the axle ends of the roller 126. By controlling the piston travel, the belt 25 is laterally aligned relative to the various rollers. Further alignment of the belt 99 relative to the roller 110 is obtained by adjusting the tension on roller 108 via the pair of bolts 132 that mount to the opposite ends thereof. Similarly, the bolt 134 is adjustable so as to control the alignment of the belt 30 relative to the nose roller 24.

It can be seen, then, that each dual transpositor 6 is comprised of a primary and a secondary transpositor conveyor and each conveyor contains a retractable nose roller for successively receiving and controllably dropping product onto a lower lying cross-feed conveyor 14. In passing, it should also be noted that, unlike the primary transpositor conveyor 30, the secondary transpositor conveyor 25 is driven in between the receipt of product at an intermittent rate. Thus, it does not continuously convey product to expose a new surface portion of the secondary belt 25 each time a product drops. In this way, the belt wear is spread out over the entire length of the belt 25, instead of being concentrated at a point.

Before continuing, attention should also be directed to FIG. 4 showing an elevation view of an alternative transpositor 7 which, depending on the application, may be employed in implementing the system of the present invention. It contains only the primary transpositor conveyor belt 30. Similarly it may be desirable to use a transpositor that only employs a lower or secondary transpositor conveyor belt such as belt 25 in FIG. 2. In either case, such transpositors are easily achieved by deleting one or the other of the associated drive assemblies from the basic dual transpositor 6. As system needs dictate, it may also be desirable to have a clear plastic infeed guard 32, such as in FIG. 4 which can be raised and lowered by a pair of pneumatic cylinders 34.

Turning attention next to FIG. 5, a cross-section view taken along lines 5—5 of FIG. 3 shows the mounting of some of the various drive assembly rollers. It also shows the placement of the split axle 66 relative to the split coupler 136, the clutch 72 relative to the axle 70 and the placement of the nose roller 24.

Referring also to FIG. 6, the mounting of the drive rollers 52 and 96 can be seen with greater particularity. As is illustrated the coupling of the drive power to the roller 52 is achieved via the chain 92 on spocket 94 attached to axle 95. The opposite end of axle 95 is chain coupled to the drive roller 96 via chain 98. The direct coupling of power to drive roller 52 by the meshed gears 138 and the placement of the axles 50 and 53 relative to one another and relative to the pair of chains 48 that couple the mating sprockets on axle 50 to the transfer gear assembly 46 is also visible.

Figure 7:
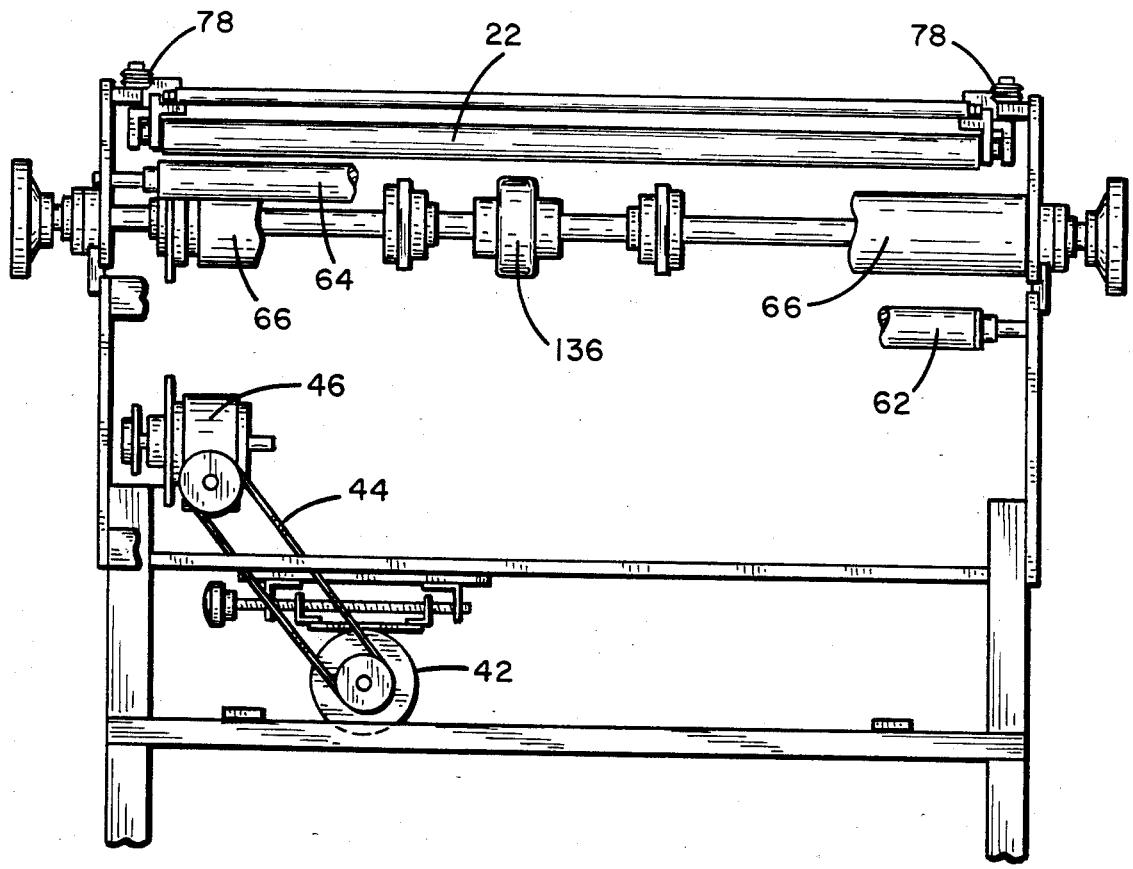
FIG. 7 is an end view taken along lines 7—7 of FIG. 4.

FIG. 7, which is an end view taken along line 7—7 of FIG. 4, shows the mounting of the motor 42, belt 44 and gear assembly 46. Similarly, the nose roller 22 relative to its mounting with respect to the V-rollers 78 is displayed.

While the present invention has been described with respect to its presently preferred embodiment, it is to be recognized that various modifications may be made thereto without departing from the spirit and scope hereto. It is accordingly, contemplated that the following claims should be interpreted so as to include those equivalent embodiment within the spirit and scope of the above-described invention.

What is claimed is:

1. A conveyor system for transporting products from a source a supply to a plurality of separate work stations in a coordinated fashion to equalize the work to be done at each such work station, said conveyor system comprising in combination:

(a) an elongated supply conveyor having infeed conveyor means for receiving product from said source of supply and a plurality of dual transpositor means disposed in tandem relationship to one another, each of said dual transpositor means including,
   1. a primary endless belt deployed about a first plurality of rollers to define a first generally horizontal flight aligned with said infeed conveyor, one of said rollers in said first plurality of rollers defining said horizontal flight being horizontally retractable to shorten said first horizontal flight;
   2. a secondary endless belt deployed about a second plurality of rollers to define a second generally horizontal flight in a plane below said first generally horizontal flight, one of said rollers in said second plurality of rollers defining said second generally horizontal flight being retractable in a direction opposite from said one of said rollers in said first plurality of rollers;
   3. said first generally horizontal flight of one of said plurality of dual transpositor means being disposed above said second generally horizontal flight of an adjacent one of said plurality of dual transpositor means; and
(b) a plurality of cross-feed conveyors, each such cross-feed conveyor comprising an endless belt deployed about a plurality of rollers to define a third generally horizontal flight extending transversely to said elongated supply conveyor, said third flight having one end thereof positioned beneath said second generally horizontal flight and the other end at one of said plurality of work stations.

2. A conveyor system as in claim 1 and further including control means responsive to the presence of said products at predetermined locations on said first and second generally horizontal flight of each dual transpositor and on said third generally horizontal flight for selectively actuating one or both of said one of said rollers in said first and second plurality of rollers to cause product to drop vertically from said primary endless belt of one dual transpositor means to the secondary endless belt of the adjacent downstream dual transpositor means or from said secondary endless belt of said adjacent downstream dual transpositor means to the cross-conveyor disposed therebeneath.

3. Apparatus as set forth in claim 2 wherein said control means includes photo-electric detector means mounted in the region of the retractable rollers of said primary and secondary endless belt for detecting the absence of product thereon so that product from said primary endless belt is only dropped on vacant areas of said secondary endless belt and product from said secondary endless belt is only dropped on vacant areas on said cross-feed conveyor.

4. A conveyor system for receiving and selectively transferring product to an underlying cross-feed conveyor or alternatively passing the product to an adjacent downstream conveyor, comprising in combination:
(a) a first transpositor means having a first endless primary conveyor means for receiving and conveying product, said primary conveyor means passing about a retractable nose roller;
(b) a second transpositor means having an indexably driven second conveyor means, said secondary conveyor means including a retractable nose roller underlying said retractable nose roller of said primary conveyor means of said first transpositor means, said secondary conveyor means receiving product from said primary conveyor means of said first transpositor means upon the retraction of said retractable nose roller of said primary conveyor means;
(c) a cross conveyor means having one end thereof underlying said secondary conveyor means of said second transpositor means such that retraction of said retractable nose roller of said secondary conveyor means of said second transpositor means deposits product onto said cross-feed conveyor; and
(d) control means associated with said primary conveyor means of said first transpositor means, with said secondary conveyor means of second transpositor means and said cross conveyor means for actuating said retractable rollers only when an immediately underlying one of said secondary conveyor means and said cross-feed conveyor means are void of product in a predetermined area of said secondary conveyor means and said cross-feed conveyor means.

5. A system as set forth in claim 1 wherein said secondary endless belt is indexably rotated prior to receipt of product from said supply conveyor.

6. A system as set forth in claim 1 including an elongated axle supported drive roller associated with each of said primary and secondary endless belts, and pneumatic control means mounted at opposite ends of said axles for adjustably varying the alignment of said endless primary and secondary belts; and
   means coupled to said retractable rollers for adjustably varying the alignment of said primary and secondary belts about said retractable rollers, whereby the alignment of said primary and secondary belts may be maintained.

7. A system as set forth in claim 1 wherein said dual transpositors each include a first clutch-driven axle having first and second arms mounted at the opposite sides thereof and first and second length adjustable linking arms coupling said first and second arms to the opposite sides of said one of said rollers in said first plurality of rollers, whereby upon the selective engagement of said clutch, said first axle revolves and retracts said one of said rollers in said first plurality of rollers a predetermined distance and at a predetermined rate causing product to drop from said primary endless belt onto said secondary endless belt.

* * * * *